United States Patent
Drohmann et al.

(10) Patent No.: US 7,147,842 B2
(45) Date of Patent: Dec. 12, 2006

(54) METHOD FOR THE PRODUCTION OF POLYMERS

(75) Inventors: Christian Drohmann, Schifferstadt (DE); Klemens Mathauer, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 35 days.

(21) Appl. No.: 10/498,087

(22) PCT Filed: Dec. 17, 2002

(86) PCT No.: PCT/EP02/14398

§ 371 (c)(1),
(2), (4) Date: Jun. 10, 2004

(87) PCT Pub. No.: WO03/054082

PCT Pub. Date: Jul. 3, 2003

(65) Prior Publication Data

US 2005/0148751 A1  Jul. 7, 2005

(30) Foreign Application Priority Data

Dec. 21, 2001 (DE) ................ 101 63 118

(51) Int. Cl.
*A61K 8/37* (2006.01)
(52) U.S. Cl. ............ 424/70.1; 424/70.11; 424/70.12; 424/70.16; 424/401
(58) Field of Classification Search .......... 424/70.1, 424/70.11, 70.12, 70.16, 401
See application file for complete search history.

(56) References Cited

U.S. PATENT DOCUMENTS 4,725,630 A   2/1988  Magee et al.

6,403,074 B1 *  6/2002  Blankenburg et al. ... 424/70.12

FOREIGN PATENT DOCUMENTS

| DE | 1 165 574 | 3/1964 |
|---|---|---|
| DE | 2 024 051 | 12/1971 |
| DE | 42 40 108 | 6/1994 |
| DE | 199 07 587 | 8/2000 |
| DE | 199 51 877 | 5/2001 |
| EP | 0 408 311 | 1/1991 |
| EP | 0 412 704 | 2/1991 |
| EP | 0 412 707 | 2/1991 |
| EP | 0 558 423 | 9/1993 |
| EP | 0 670 342 | 9/1995 |
| EP | 0 815 844 | 1/1998 |
| EP | 0 815 845 | 1/1998 |
| FR | 2 791 558 | 10/2000 |
| WO | 99/04750 | 2/1999 |

OTHER PUBLICATIONS

Von H. Fikentscher, Cellulosechemie, vol. 3, pp. 58-64 1932.

* cited by examiner

*Primary Examiner*—Robert D. Harlan
(74) *Attorney, Agent, or Firm*—Oblon, Spivak, McClelland, Maier & Neustadt, P.C.

(57) ABSTRACT

Process for the preparation of polymers by free-radical polymerization from
  (a) ethylenically unsaturated monomers and
  (b) polyalkylene oxide-containing silicone derivatives,
where the polymerization is carried out in the presence of alkanethiols having a carbon chain length of from C 10 to C 12.

18 Claims, No Drawings

METHOD FOR THE PRODUCTION OF POLYMERS

Polymers with film-forming properties are used for cosmetic preparations and are suitable, in particular, as additives for skin and hair cosmetics.

In cosmetic preparations for the skin, polymers can develop a particular action. The polymers can, inter alia, contribute to keeping the skin moist and conditioning the skin and to improving the feel of the skin. The skin becomes smoother and more supple.

In cosmetic preparations for the hair, polymers are used for setting, improving the structure of and shaping hair. They increase combability and improve the feel of the hair. These hair-treatment compositions generally comprise a solution of the film former in an alcohol or a mixture of alcohol and water.

One requirement of hair-treatment compositions is to impart, inter alia, shine, flexibility and a natural, pleasant feel to the hair.

It is known to use vinyllactam homo- and copolymers or carboxylate group-containing polymers. The desired profile of properties, such as strong hold in high atmospheric humidity, elasticity, ability to be washed out of the hair and compatibility with the other formulation components, is achieved by copolymerization of a combination of hydrophobic, elastifying and carboxyl group-containing monomers.

The feel of hairstyles set with these polymers is, however, unpleasantly harsh and unnatural. Although the addition of softeners improves the feel of such hairstyles, it also reduces the setting action.

Use is frequently made of polysiloxanes, although these are incompatible with polar polymers and often require further additives in order that they can be formulated at all. Separations can lead to problems both during storage of the formulation and also during use.

In order to prevent separations, there has therefore been no lack of attempts to covalently bond polysiloxane groups to the polymer. EP-A 408 311 describes graft copolymers with a carbon main chain onto which polydimethylsiloxane side chains are bonded. Only polymers which are prepared using unsaturated monomers which carry a polysiloxane chain are described.

EP-A 670 342 describes the use of alkoxylated silicones in haircare compositions. The use of polymers of unsaturated compounds in haircare compositions is not disclosed. Although the use of alkoxylated silicones as additive to commercially available hairsetting polymers improves the feel thereof, it also leads to a reduced setting action.

European patents EP-A 412 704 and EP-A 412 707 describe polysiloxane groups in the form of macromonomers having molar masses of from 1000 to 50,000 which are polymerized with customary hydrophobic and hydrophilic monomers. The synthesis of these monomers is extremely complex. Because of their high molecular weight, it is virtually impossible to separate out unreacted macromonomers and unreactive impurities thereof from the polymers. These represent a toxicological and allergenic risk. Moreover, the copolymers obtained, in order to achieve a good action, must often be formulated only in combination with other polymers, carriers and other auxiliaries, as the above-mentioned patents teach.

DE 42 40 108 describes polysiloxane-containing binders which are suitable as soil repellent coatings, in particular as antigraffiti coatings. These binders are, however, paint-like and are not suitable for cosmetic purposes.

WO 99/04750 describes polymers obtainable by free-radical polymerization of ethylenically unsaturated monomers in the presence of polyalkylene oxide-containing silicone derivatives.

WO 99/04750 describes the preparation of polymers with the addition of ethylhexyl thioglycolate (Examples 15 to 20).

A disadvantage of the polymers obtainable in accordance with WO 99/04750 is primarily their strong intrinsic odor, which sometimes increases further upon storage and/or formulation in cosmetic compositions. This leads to use of the known products being possible only to a limited extent. In cosmetic formulations attempts are made to conceal this intrinsic odor of the polymers using perfume oils. Apart from the fact that complete concealment of the intrinsic odor is not always possible, the use of perfume oils leads in individual cases to undesired allergic reactions. This limits the use of known polymers in cosmetic compositions. Moreover, the polymers should themselves be less irritating than the products of the prior art and thus be suitable for use in antiallergenic cosmetic preparations.

It is an object of the present invention to provide a process in which polymers are obtained which, because of their neutral odor, are suitable for a wide use spectrum, in particular in cosmetic compositions, and are also suitable, in particular, for formulations without the addition of perfume oils. In this connection, it is of particular interest that the polymers do not develop an intrinsic odor in cosmetic preparations even after storage. In addition, performance properties, such as the ability to be washed out of the hair, compatibility with other cosmetic ingredients, in particular solubility in hydrous preparations, feel and setting of the treated hair, are desired. The provision of polymers which are less irritating than the products of the prior art is also desirable. It is also an object to provide polymers which can be used in powder form and thus are suitable, in particular, for specific decorative cosmetic preparations.

We have found that this object is achieved by a process in which (a) ethylenically unsaturated monomers and
(b) polyalkylene oxide-containing silicone derivatives are reacted by free-radical polymerization in the presence of alkanethiols having a carbon chain length of from C 10 to C 12.

In contrast to products of the prior art, in particular to polymers according to WO 99/04750, the polymers obtainable in this way are characterized by freedom from odor and do not develop an odor even upon storage either as individual substances or else in cosmetic preparations. At the same time, the polymers obtainable in this way exhibit good film-forming properties and good compatibility with customary cosmetic ingredients.

The alkanethiols used are linear and branched alkanethiols having a carbon chain length of from C 10 to C 12. Particular preference is given to linear alkanethiols, and preference is also given to alkanethiols having a chain length of C 10 and C 11. An alkanethiol which may be mentioned is n-decanethiol.

The alkanethiols can also be used in mixtures.

The alkanethiols are usually used in amounts of from 0.1 to 5% by weight, in particular 0.25 to 2% by weight, based on the monomers (a). The alkanethiols are usually added to the polymerization together with the monomers.

In a preferred embodiment of the process, the polymers are converted into powder form. For this purpose, all methods known to the person skilled in the art are suitable, such as, for example, spray-drying, freeze-drying and fluidized-bed drying.

Particular preference is given to spray-drying.

Suitable polymerizable monomers (a) are ethylenically unsaturated monomers. In this connection, it is possible to use either individual monomers or combinations of two or more monomers.

Monomers which can be polymerized with a reaction initiated by free radicals are preferred. The term ethylenically unsaturated means that the monomers have at least one polymerizable carbon-carbon double bond which can be mono-, di-, tri- or tetra-substituted.

The ethylenically unsaturated monomers (a) can be described by the formula below:

$$X-C(O) CR^7=CHR^6$$

where

X is chosen from the group of radicals —OH, —OM, —OR$^8$, NH$_2$, —NHR$^8$, N(R$^8$)$_2$;

M is a cation chosen from the group consisting of: Na+, K+, Mg++, Ca++, Zn++, NH$_4^+$, alkylammonium, dialkylammonium, trialkylammonium and tetraalkylammonium;

the radicals R$^8$ may be identical or different, chosen from the group consisting of —H, C$_1$–C$_{40}$ linear or branched-chain alkyl radicals, N,N-dimethylaminoethyl, 2-hydroxyethyl, 2-methoxyethyl, 2-ethoxyethyl, hydroxypropyl, methoxypropyl or ethoxypropyl.

R$^7$ and R$^6$, independently of one another, are chosen from the group consisting of: —H, C$_1$–C$_8$ linear or branched-chain alkyl chains, methoxy, ethoxy, 2-hydroxyethoxy, 2-methoxyethoxy and 2-ethoxyethyl.

Representative but nonlimiting examples of suitable monomers (a) are, for example, acrylic acid and salts, esters and amides thereof. The salts can be derived from any nontoxic metal, ammonium or substituted ammonium counterions.

The esters can be derived from C$_1$–C$_{40}$ linear, C$_3$–C$_{40}$ branched-chain or C$_3$–C$_{40}$ carbocyclic alcohols, from polyfunctional alcohols having 2 to about 8 hydroxyl groups, such as ethylene glycol, hexylene glycol, glycerol, and 1,2,6-hexanetriol, from aminoalcohols or from alcohol ethers, such as methoxyethanol and ethoxyethanol or polyethylene glycols.

Also suitable are N,N-dialkylaminoalkyl acrylates and methacrylates and N,N-dialkylaminoalkyl acrylamides and methacrylamides of the formula (II)

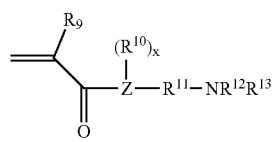

(II)

where R$^9$=H, alkyl having 1 to 8 carbon atoms,
R$^{10}$=H, methyl,
R$^{11}$=alkylene having 1 to 24 carbon atoms, optionally substituted by alkyl,
R$^{12}$, R$^{13}$=C$_1$–C$_{40}$ alkyl radical,
z=nitrogen when x=1 or oxygen when x=0.

The amides can be unsubstituted, N-alkyl or N-alkylamino monosubstituted, or N,N-dialkyl-substituted or N,N-dialkylamino disubstituted, in which the alkyl or alkylamino groups are derived from C$_1$–C$_{40}$ linear, C$_3$–C$_{40}$ branched-chain or C$_3$–C$_{40}$ carbocyclic units. In addition, the alkylamino groups can be quaternized.

Preferred monomers of the formula II are N,N-dimethylaminomethyl (meth)acrylate, N,N-diethylaminomethyl (meth)acrylate, N,N-dimethylaminoethyl (meth)acrylate, N,N-diethylaminoethyl (meth)acrylate.

Monomers (a) which can likewise be used are substituted acrylic acids, and salts, esters and amides thereof, where the substituents on the carbon atoms are in the two or three position on the acrylic acid, and are chosen, independently of one another, from the group consisting of C$_1$–C$_4$-alkyl, —CN, COOH, particularly preferably methacrylic acid, ethacrylic acid and 3-cyanoacrylic acid. These salts, esters and amides of these substituted acrylic acids can be chosen as described above for salts, esters and amides of acrylic acid.

Other suitable monomers (a) are vinyl and allyl esters of C$_1$–C$_{40}$ linear, C$_3$–C$_{40}$ branched-chain or C$_3$–C$_{40}$ carbocyclic carboxylic acids (e.g.: vinyl acetate, vinyl propionate, vinyl neononanoate, vinyl neoundecanoate or vinyl t-butylbenzoate); vinyl or allyl halides, preferably vinyl chloride and allyl chloride, vinyl ethers, preferably methyl, ethyl, butyl or dodecyl vinyl ether, vinylformamide, vinylmethylacetamide, vinylamine; vinyllactams, preferably vinylpyrrolidone and vinylcaprolactam, vinyl- or allyl-substituted heterocyclic compounds, preferably vinylpyridine, vinyloxazoline and allylpyridine.

Also suitable are N-vinylimidazoles of the formula III in which R$^{14}$ to R$^{16}$, independently of one another, are hydrogen, C$_1$–C$_4$-alkyl or phenyl:

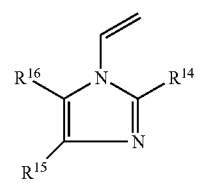

(III)

Further suitable monomers (a) are diallylamines of the formula (IV)

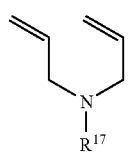

(IV)

where R$^{17}$=C$_1$–C$_{24}$ alkyl.

Further suitable monomers (a) are vinylidene chloride; and hydrocarbons having at least one carbon-carbon double bond, preferably styrene, alpha-methylstyrene, tert-butylstyrene, butadiene, isoprene, cyclohexadiene, ethylene, propylene, 1-butene, 2-butene, isobutylene, vinyltoluene, and mixtures of these monomers.

Particular suitable monomers (a) are acrylic acid, methacrylic acid, ethylacrylic acid, methyl acrylate, ethyl acrylate, propyl acrylate, n-butyl acrylate, isobutyl acrylate, t-butyl acrylate, 2-ethylhexyl acrylate, decyl acrylate, methyl methacrylate, ethyl methacrylate, propyl methacrylate, n-butyl methacrylate, isobutyl methacrylate, t-butyl methacrylate, 2-ethylhexyl methacrylate, decyl methacrylate, methyl ethacrylate, ethyl ethacrylate, n-butyl ethacrylate, isobutyl ethacrylate, t-butyl ethacrylate, 2-ethylhexyl ethacrylate, decyl ethacrylate, 2,3-dihydroxypropyl acrylate, 2,3-dihydroxypropyl methacrylate, 2-hydroxyethyl acrylate, hydroxypropyl acrylates, 2-hydroxyethyl methacrylate, 2-hydroxyethyl ethacrylate, 2-methoxyethyl acrylate, 2-methoxyethyl methacrylate, 2-methoxyethyl ethacrylate, 2-ethoxyethyl methacrylate, 2-ethoxyethyl ethacrylate, hydroxypropyl methacrylates, glyceryl monoacrylate, glyceryl monomethacrylate, polyalkylene glycol (meth)acrylates, unsaturated sulfonic acids, such as, for example, acrylamidopropanesulfonic acid;

acrylamide, methacrylamide, ethacrylamide, N-methylacrylamide, N,N-dimethylacrylamide, N-ethylacrylamide, N-isopropylacrylamide, N-butylacrylamide, N-t-butylacrylamide, N-octylacrylamide, N-t-octylacrylamide, N-octadecylacrylamide, N-phenylacrylamide, N-methylmethacrylamide, N-ethylmethacrylamide, N-dodecylmethacrylamide, 1-vinylimidazole, 1-vinyl-2-methylimidazole, N,N-dimethylaminomethyl (meth)acrylate, N,N-diethylaminomethyl (meth)acrylate, N,N-dimethylaminoethyl (meth)acrylate, N,N-diethylaminoethyl (meth)acrylate, N,N-dimethylaminobutyl (meth)acrylate, N,N-diethylaminobutyl (meth)acrylate, N,N-dimethylaminohexyl (meth)acrylate, N,N-dimethylaminooctyl (meth)acrylate, N,N-dimethylaminododecyl (meth)acrylate, N-[3-(dimethylamino)propyl]methacrylamide, N-[3-(dimethylamino)propyl]acrylamide, N-[3-(dimethylamino)butyl]methacrylamide, N-[8-(dimethylamino)octyl] methacrylamide, N-[12-(dimethylamino)dodecyl] methacrylamide, N-[3-(diethylamino)propyl] methacrylamide, N-[3-(diethylamino)propyl]acrylamide;

maleic acid, fumaric acid, maleic anhydride and its monoesters, crotonic acid, itaconic acid, diallyldimethylammonium chloride, vinyl ethers (for example: methyl, ethyl, butyl or dodecyl vinyl ethers), vinylformamide, vinylmethylacetamide, vinylamine; methyl vinyl ketone, maleimide, vinylpyridine, vinylimidazole, vinylfuran, styrene, styrene sulfonate, allyl alcohol, and mixtures thereof.

Of these, particular preference is given to acrylic acid, methacrylic acid, maleic acid, fumaric acid, crotonic acid, maleic anhydride, and monoesters thereof, methyl acrylate, methyl methacrylate, ethyl acrylate, ethyl methacrylate, n-butyl acrylate, n-butyl methacrylate, t-butyl acrylate, t-butyl methacrylate, isobutyl acrylate, isobutyl methacrylate, 2-ethylhexyl acrylate, N-t-butylacrylamide, N-octylacrylamide, 2-hydroxyethyl acrylate, hydroxypropyl acrylate, 2-hydroxyethyl methacrylate, hydroxypropyl methacrylate, alkylene glycol (meth)acrylates, unsaturated sulfonic acids, such as, for example, acrylamidopropanesulfonic acid, vinylpyrrolidone, vinylcaprolactam, vinyl ethers (e.g.: methyl, ethyl, butyl or dodecyl vinyl ethers), vinylformamide, vinylmethylacetamide, vinylamine, 1-vinylimidazole, 1-vinyl-2-methylimidazole, N,N-dimethylaminomethyl methacrylate and N-[3-(dimethylamino)propyl]methacrylamide; 3-methyl-1-vinylimidazolium chloride, 3-methyl-1-vinylimidazolium methylsulfate, N,N-dimethylaminoethyl methacrylate, N-[3-(dimethylamino)propyl]methacrylamide quaternized with methyl chloride, methyl sulfate or diethyl sulfate.

In a very particularly preferred embodiment, the monomers (a) used are t-butyl acrylate (=a1) and methacrylic acid (=a2).

Monomers with a basic nitrogen atom can be quaternized in the following way:

examples of agents suitable for quaternizing the amines are alkyl halides having 1 to 24 carbon atoms in the alkyl group, e.g. methyl chloride, methyl bromide, methyl iodide, ethyl chloride, ethyl bromide, propyl chloride, hexyl chloride, dodecyl chloride, lauryl chloride and benzyl halides, in particular benzyl chloride and benzyl bromide. Further suitable quaternizing agents are dialkyl sulfates, in particular dimethyl sulfate or diethyl sulfate. The quaternization of the basic amines can also be carried out with alkylene oxides, such as ethylene oxide or propylene oxide, in the presence of acids. Preferred quaternizing agents are: methyl chloride, dimethyl sulfate or diethyl sulfate.

In a preferred embodiment, the monomers (a) used are (meth)acrylates.

The quaternization can be carried out before or after the olymerization.

Furthermore, the reaction products of unsaturated acids, such as, for example, acrylic acid or methacrylic acid, with a quaternized epichlorohydrin of the formula (V) ($R^{18}$=C 1 to C 40 alkyl) can be used.

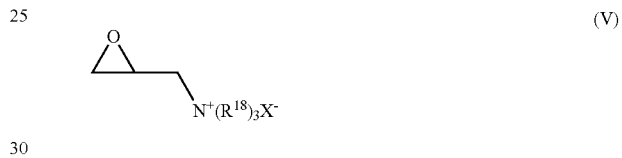

(V)

Examples thereof are:
(meth)acryloyloxyhydroxypropyltrimethylammonium chloride and (meth)acryloyloxyhydroxypropyltriethylammonium chloride.

The basic monomers can also be cationized by neutralizing them with mineral acids, such as, for example, sulfuric acid, hydrochloric acid, hydrobromic acid, hydroiodic acid, phosphoric acid or nitric acid, or with organic acids, such as, for example, formic acid, acetic acid, lactic acid or citric acid.

In addition to the abovementioned monomers, it is also possible to use, as monomers (a), "macromonomers", such as, for example, silicone-containing macromonomers containing one or more free-radically polymerizable groups, or alkyloxazoline macromonomers, as are described, for example, in EP 408 311.

Furthermore, it is possible to use fluorine-containing monomers, as are described, for example, in EP 558 423, or compounds which have a crosslinking action or regulate molecular weight, in combination or alone.

Regulators which can be used are the customary compounds known to the person skilled in the art, such as, for example, sulfur compounds (e.g.: mercaptoethanol, 2-ethylhexyl thioglycolate, thioglycolic acid or dodecyl mercaptan) and tribromochloromethane or other compounds which have a regulating effect on the molecular weight of the resulting polymers. Where appropriate, it is also possible to use thiol group-containing silicone compounds. Preference is given to using silicone-free regulators.

Crosslinking monomers which can be used are compounds having at least two ethylenically unsaturated double bonds, such as, for example, esters of ethylenically unsaturated carboxylic acids, such as acrylic acid or methacrylic acid, and polyhydric alcohols, ethers of at least dihydric alcohols, such as, for example, vinyl ether or allyl ether. Also suitable are straight-chain or branched, linear or cyclic, aliphatic or aromatic hydrocarbons which have at least two double bonds which, in the case of the aliphatic hydrocarbons, must not be conjugated. Also suitable are amides of acrylic acid and methacrylic acid and N-allylamines of at least difunctional amines, such as, for example, 1,2-diaminoethane, 1,3-diaminopropane. Also suitable are triallylamine or corresponding ammonium salts, N-vinyl compounds of urea derivatives, at least difunctional amides, cyanurates or urethanes. Further suitable crosslinkers are divinyldioxane, tetraallylsilane or tetravinylsilane.

Particularly preferred crosslinkers are, for example, methylenebisacrylamide, triallylamine and triallylammonium salts, divinylimidazole, N,N'-divinylethyleneurea, reaction products of polyhydric alcohols with acrylic acid or methacrylic acid, methacrylic esters and acrylic esters of polyalkylene oxides or polyhydric alcohols which have been reacted with ethylene oxide and/or propylene oxide and/or epichlorohydrin.

The monomers (a) according to the invention can, where they contain ionizable groups, be partially or completely neutralized before or after the polymerization using acids or bases in order in this way, for example, to adjust the solubility or dispersibility in water to a desired level.

Neutralizing agents which can be used for monomers carrying acid groups are, for example, mineral bases, such as sodium carbonate, alkali metal hydroxides, and ammonia, organic bases, such as aminoalcohols, specifically 2-amino-2-methyl-1-propanol, monoethanolamine, diethanolamine, triethanolamine, triisopropanolamine, tri[(2-hydroxy)-1-propyl]amine, 2-amino-2-methyl-1,3-propanediol, 2-amino-2-hydroxymethyl-1,3-propanediol, and diamines, such as, for example, lysine.

Neutralizing agents which can be used for monomers carrying cationizable groups are, for example, mineral acids, such as hydrochloric acid, sulfuric acid or phosphoric acid, and also organic acids, such as carboxylic acids, lactic acid, citric acid or others.

Particularly suitable polyalkylene oxide-containing silicone derivatives (b) are those which contain the structural elements below:

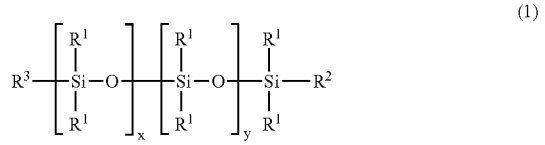

(1)

where:

$R^2$=CH$_3$ or

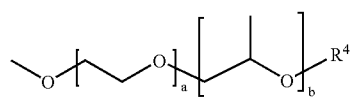

$R^3$=CH$_3$ or $R^2$
$R^4$=H, CH$_3$,

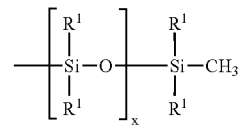

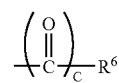

$R^6$ is an organic radical having 1 to 40 carbon atoms which may contain amino, carboxylic acid or sulfonate groups, and, when c=O, is also the anion of an inorganic acid, and where the radicals $R^1$ may be identical or different, and originate either from the group of aliphatic hydrocarbons having 1 to 20 carbon atoms, of cyclic aliphatic hydrocarbons having 3 to 20 carbon atoms, are of an aromatic nature or are identical to $R^5$, where:

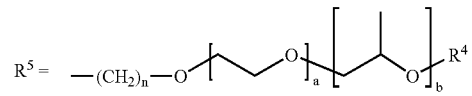

with the proviso that at least one of the radicals $R^1$, $R^2$ or $R^3$ is a polyalkylene oxide-containing radical according to the above definition, and n is an integer from 1 to 6, x and y are integers such that the molecular weight of the polysiloxane block is between 300 and 30,000, a, b may be integers between 0 and 50, with the proviso that the sum of a and b is greater than 0, and c is 0 or 1.

Preferred radicals $R^2$ and $R^5$ are those in which the sum a+b is between 5 and 30.

The groups $R^1$ are preferably chosen from the following group: methyl, ethyl, propyl, butyl, isobutyl, pentyl, isopentyl, hexyl, octyl, decyl, dodecyl and octadecyl, cycloaliphatic radicals, specifically cyclohexyl, aromatic groups, specifically phenyl or naphthyl, mixed aromatic-aliphatic radicals, such as benzyl or phenylethyl, and tolyl and xylyl and $R^5$.

Particularly suitable radicals $R^4$ are those in which, in cases where $R^4$=—(CO)$_c$—$R^6$, $R^6$ is any desired alkyl, cycloalkyl or aryl radical which has between 1 and 40 carbon atoms and which can carry further ionogenic groups such as NH2, COOH, SO$_3$H.

Preferred inorganic radicals $R^6$ are, where c=O, phosphate and sulfate.

In a particularly preferred embodiment of the present invention, the polyalkylene oxide-containing silicone derivative (b) used is a compound according to the formula below:

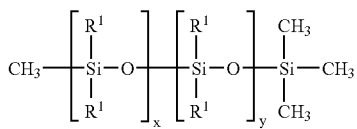

where
R$^1$=—CH$_3$

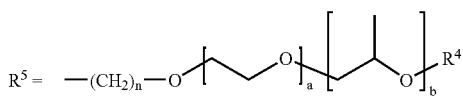

R$^4$=—H; —COCH$_3$, alkyl with C$_1$–C$_4$
n=1 to 6, in particular 2 to 4, preferably 3
x and y are integers such that the molecular weight of the polysiloxane block is between 1000 and 10,000,
a, b may be integers between 0 and 50, with the proviso that the sum of a and b is greater than 0.

Such particularly preferred silicone derivatives are known under the CAS No. 872 44-72-2. Commercial products are available under the names Belsil DMC 6031™ (Wacker), Dabco DC 193, Dabco DC 5357, Dow Corning 198™, Dow Corning 5039™ and Silwet 7600™ (Witco).

Such particularly preferred silicone derivatives are known under the CAS No. 71965-38-3. Commercial products are available under the names Abil B 8842, Abil B 8843, Silwet L 7607 (Witco).

Particularly preference is also given to those silicone derivatives which are available under the trade names Belsil DMC 6032™ (Wacker) and Dow Corning 190™ (Dow Chemicals).

The monomers (a) of the polysiloxane-containing polymers of the present invention can constitute from 50 to 99.9% by weight, preferably 70 to 99% by weight, particularly preferably 85 to 98% by weight. If the ethylenically unsaturated monomers (a) are used as a combination of two monomers (a1 and a2), it has proven advantageous to use 49.5 to 99% by weight (a1) and 0.5 to 40% by weight (a2).

The silicone derivatives (b) are generally present in the polymer according to the invention in amounts of from 0.1 to 50% by weight, preferably from 0.5 to 20% by weight, particularly preferably from 2 to 15% by weight.

In a particularly preferred embodiment, the monomer mixture used comprises
(a1) 49.5 to 99% by weight of (meth)acrylate, in particular tert-butyl acrylate
(a2) 0.5 to 40% by weight of another (meth)acrylate, in particular methacrylic acid
(b) 0.5 to 20% by weight of a polyalkylene oxide-containing silicone derivative according to the formula below:

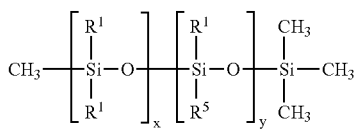

where
R$^1$=—CH$_3$

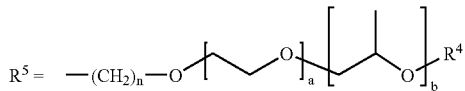

R$^4$=—H; —COCH$_3$, alkyl having C$_1$–C$_4$
n=1 to 6, in particular 2 to 4, preferably 3
x and y are integers such that the molecular weight of the polysiloxane block is between 1000 and 10,000,
a, b may be integers between 0 and 50, with the proviso that the sum of a and b is greater than 0.

If the silicone compounds (b) are not present during the polymerization, but are mixed in after the polymerization, very soft tacky films are generally obtained, which are unsuitable for the applications according to the invention in cosmetics for skin and hair.

This indicates that, during the polymerization, grafting of the polymers onto the silicone compounds may result, and this contributes to the good film properties, such as freedom from tack, high surface smoothness and hardness and also improved blocking resistance. However, mechanisms other than grafting by which the polymers according to the invention achieve their advantageous properties are also conceivable.

The term "polymerizable" means that the monomers used can be polymerized using any conventional synthetic method.

For example, this can be solution polymerization, emulsion polymerization, inverse emulsion polymerization, suspension polymerization, inverse suspension polymerization or precipitation polymerization, without the usable methods being limited thereto. In the case of solution polymerization, water, customary organic solvents or the silicone derivatives according to the invention themselves, or mixtures of said solvents, can be used as solvents.

The polymers according to the invention preferably have a K value (measured in accordance with Fickentscher, Cellulosechemie, Vol. 13, pp. 58–64 (1932) at 25° C., in a 1% by weight ethanolic solution) of from 30 to 50, preferably 37 to 41.

Particularly suitable polymers are those which are soluble in water or whose dispersibility in water is so great that they are soluble in a water: ethanol=20:80 (% by volume: % by volume) solvent mixture in an amount of more than 0.1 g/l, preferably more than 0.2 g/l.

For the purposes of the invention, "water dispersible" polymers is intended to mean polymers which, upon contact in water, form a fluid within 24 hours which does not allow any solid particles to be detected with the eye without optical devices. To check whether a polymer is dispersible in water, 100 mg of the polymer in the form of a 100 μm-thick film are added to 100 ml of water (20° C.) and shaken for 24 hours on a commercially available shaking table. If, after the shaking, solid particles can no longer be perceived, but the fluid possesses turbidity, the polymer is dispersible in water; without turbidity, it is referred to as soluble in water.

During polymerization of the monomers, it is optionally possible for other polymers, such as, for example, homo- and copolymers of ethylenically unsaturated monomers, and also polyamides, polyurethanes or polyesters to also be present. The polyamides, polyurethanes, polyesters are preferably ionically modified, e.g. with carboxylate or sulfonate groups.

The polymers are usually prepared using initiators, such as peroxo or azo compounds, for example dibenzoyl oxide, t-butyl perpivalate, t-butyl per-2-ethylhexanoate, di-t-butyl peroxide, t-butyl hydroperoxide, 2,5-dimethyl-2,5-di(t)butylperoxy(hexane), alkali metal or ammonium persulfates, azobisisobutyronitrile, 2,2'-azobis(2-methylbutyronitrile), 2,2'-azobis(2,4-dimethylvaleronitrile), 1,1'-azobis(1-cyclohexanecarbonitrile), 2,2'-azobis(2-amidinopropane) salts, 4,4'-azobis(4-cyanovaleric acid) or 2-(carbamoylazo)isobutyronitrile etc., hydrogen peroxide or redox initiators. The initiators are usually used in amounts up to 10% by weight, preferably 0.02 to 5% by weight, based on the monomers to be polymerized.

The emulsion polymerization is usually carried out with the exclusion of oxygen at temperatures in the range from 20 to 200° C. The polymerization can be carried out batchwise or continuously.

The procedure preferably involves metering at least some of the monomers, initiators and alkanethiols uniformly into the reaction vessel through the polymerization. The monomers, the alkanethiol and the initiator can, however, also be introduced initially into the reactor and be polymerized, cooling being necessary in some cases.

When the polymerization is complete, the residual monomer content can be reduced by carrying out an afterpolymerization in a known manner by adding suitable initiators. If desired, a physical deodorization can also be carried out in a customary manner, for example by introducing steam.

The K value desired in each case can be established in a manner known per se through the choice of polymerization conditions, for example the polymerization temperature and the initiator concentration. In some cases, particularly when emulsion and suspension polymerization are used, the use of regulators, in particular of sulfur compounds, such as mercaptoethanol, 2-ethylhexyl thioglycolate or thioglycolic acid, may be appropriate for reducing the K value. The K values are measured in accordance with Fikentscher, Cellulosechemie, Vol. 13, pp. 58 to 64 (1932) at 25° C. in a 1% strength by weight ethanolic solution and represent a measure of the molecular weight.

If the polymer is prepared by emulsion polymerization, the resulting dispersion can either be incorporated directly into an aqueous, aqueous-alcoholic or alcoholic cosmetic preparation, for example a hair-setting preparation, or the dispersion is dried, e.g. spray-dried, so that the polymer can be used and processed as powder.

The invention further provides polymers obtainable by the processes as claimed in claims 1 to 12.

The polymers obtainable in this way are characterized by low odor, low allergenic potential and also good hair cosmetic properties.

The invention further provides for the use of the polymers according to the invention, in particular in powder form, in cosmetic preparations, in particular in hair cosmetic preparations.

The polymers are particularly preferably used in hair cosmetic preparations. Hair cosmetic preparations which may be mentioned are hair cures, hair lotions, hair rinses, hair emulsions, split-end fluids, neutralizing agents for permanent waves, hot-oil treatment preparations, conditioners, curl relaxers, styling wrap lotions, setting lotions, shampoos, hair waxes, pomades, hair foams, hair colorants or hairsprays. Particular preference is given to the use of the acrylate polymers in hairstyle setting compositions which are in the form of spray preparations and/or hair foams.

The polymers according to the invention are characterized in hair cosmetic preparations by their high compatibility with the nonpolar propellants, in spray preparations, in particular with hydrocarbons such as n-propane, isopropane, n-butane, isobutane, n-pentane and mixtures thereof. They have a good hair-setting action and are characterized by the fact that they cause virtually no sticking-together of the hair.

In addition to the freedom from odor, the polymers have excellent results for the performance properties in hair cosmetic preparations. They dissolve in alcohols such as ethanol or isopropanol and in mixtures of these alcohols with water to form clear solutions. The clarity of the solutions is also obtained when the solutions are used in standard spray formulations together with propellants such as dimethyl ether. The hair-setting compositions according to the invention can be washed out of the hair without problems. Hair treated therewith has increased softness and a pleasant natural feel. The setting action is also good, making it possible, in principle, to reduce the required amount of film former in the hairspray formulation. Due to the fact that the polymers are free from odor, it is possible, as necessary, to dispense with an addition of odor-concealing perfume oils. For the reasons given, the polymers are suitable in particular as film formers in hair cosmetic preparations.

Preference is given to the use of the polymers in cosmetic preparations, in particular in hairspray preparations, which comprise the following constituents:

0.1 to 20% by weight, preferably 0.5 to 10% by weight, in particular 2 to 6% by weight, of the polymer 1 to 99.9% by weight, preferably 5 to 50% by weight, in particular 10 to 20% by weight, of water 0 to 95% by weight, preferably 20 to 60% by weight, in particular 25 to 50% by weight, of a customary organic solvent, such as primarily ethanol, isopropanol and dimethoxymethane and also acetone, n-propanol, n-butanol, 2-methoxypropan-1-ol, n-pentane, n-hexane, cyclohexane, n-heptane, n-octane or dichloromethane or mixtures thereof 0 to 90% by weight, preferably 30 to 80% by weight, in particular 45 to 60% by weight, of a customary propellant, such as n-propane, isopropane, n-butane, isobutane, 2,2-dimethylbutane, n-pentane, isopentane, dimethyl ether, difluoroethane, fluorotrichloromethane, dichlorodifluoromethane or dichlorotetrafluoroethane, HCF 152 A or mixtures thereof.

Of said compounds, the propellants (propellant gases) primarily used are the hydrocarbons, in particular propane, n-butane, n-pentane and mixtures thereof, and also dimethyl ether and difluoroethane. In some cases, one or more of said chlorinated hydrocarbons are co-used in propellant mixtures, but only in small amounts, for example up to 20% by weight, based on the propellant mixture.

The hair cosmetic preparations according to the invention are also particularly suitable for pump spray preparations without the addition of propellants, or else for aerosol sprays with customary compressed gases such as nitrogen, compressed air or carbon dioxide as propellant.

A hydrous standard spray formulation has, for example, the following composition:

| | |
|---|---|
| 2 to 10% by weight | of the polymer |
| 10 to 76% by weight | of ethanol |
| 2 to 20% by weight | of water |
| 10 to 60% by weight | of dimethyl ether and/or propane/n-butane and/or propane/isobutane. |

The polymers according to the invention may be present in end preparations in the form of aqueous or aqueous-alcoholic solutions, O/W and W/O emulsions in the form of shampoos, creams, foams, lotion, mousse, sprays (pump spray or aerosol), gels or gel sprays, and accordingly may be formulated with further customary auxiliaries.

Further customary auxiliaries which may be mentioned are: surfactants, oil bodies, emulsifiers, co-emulsifiers, super-fatting agents, pearlescent waxes, bodying agents, thickeners, fats, waxes, silicone compounds, hydrotropic agents, preservatives, perfume oils, dyes, stabilizers, pH regulators, cosmetic care substances and active ingredients, such as AHAs, fruit acids, ceramides, phytantriol, bisabolol, panthenol, collagen, provitamins and vitamins, e.g. vitamin A, E and C, proteins and protein hydrolysates (e.g. wheat, almond or pea proteins), solubilizers, complexing agents, repellents, bleaches, colorants, tinting agents, tanning agents (e.g. dihydroxyacetone), micropigments, such as titanium dioxide or zinc oxide and the like. In addition, polymers may be present.

Suitable anionic surfactants are, for example, alkyl sulfates, alkyl ether sulfates, alkylsulfonates, alkylarylsulfonates, alkyl succinates, alkyl sulfosuccinates, N-alkoylsarcosinates, acyl taurates, acyl isethionates, alkyl phosphates, alkyl ether phosphates, alkyl ether carboxylates, alpha-olefinsulfonates, in particular the alkali metal and alkaline earth metal salts, e.g. sodium, potassium, magnesium, calcium, and ammonium and triethanolamine salts. The alkyl ether sulfates, alkyl ether phosphates and alkyl ether carboxylates can have between 1 and 10 ethylene oxide or propylene oxide units, preferably 1 to 3 ethylene oxide units, in the molecule.

Suitable compounds are, for example, sodium lauryl sulfate, ammonium lauryl sulfate, sodium lauryl ether sulfate, ammonium lauryl ether sulfate, sodium lauryl sarcosinate, sodium oleyl succinate, ammonium lauryl sulfosuccinate, sodium dodecylbenzenesulfonate, triethanolamine dodecylbenzenesulfonate.

Suitable amphoteric surfactants are, for example, alkylbetaines, alkylamidopropylbetaines, alkylsulfobetaines, alkyl glycinates, alkyl carboxyglycinates, alkyl amphoacetates or amphopropionates, alkyl amphodiacetates or amphodipropionates.

For example, cocodimethylsulfopropylbetaine, laurylbetaine, cocamidopropylbetaine or sodium cocamphopropionate may be used.

Suitable nonionic surfactants are, for example, the reaction products of aliphatic alcohols or alkylphenols having 6 to 20 carbon atoms in the alkyl chain, which may be linear or branched, with ethylene oxide and/or propylene oxide. The amount of alkylene oxide is approximately 6 to 60 mol per mole of alcohol. Also suitable are alkylamine oxides, mono- or dialkylalkanolamides, fatty acid esters of polyethylene glycols, ethoxylated fatty acid amides, alkyl polyglycosides or sorbitan ether esters.

In addition, the agents can comprise customary cationic surfactants, such as e.g. quaternary ammonium compounds, for example cetyltrimethylammonium chloride.

The agents according to the invention, in particular in the form of shampoo formulations, usually comprise anionic surfactants as base surfactants, and amphoteric and nonionic surfactants as cosurfactants.

The agents usually comprise 2 to 50% by weight of surfactants, preferably 5 to 40% by weight, particularly preferably 8 to 30% by weight.

Suitable oily substances are, for example, Guerbet alcohols based on fatty alcohols having 6 to 18, preferably 8 to 10, carbon atoms, esters of linear $C_6$–$C_{22}$-fatty acids with linear $C_6$–$C_{22}$-fatty alcohols, esters of branched $C_6$–$C_{13}$-carboxylic acids with linear $C_6$–$C_{22}$-fatty alcohols, esters of linear $C_6$–$C_{22}$-fatty acids with branched alcohols, in particular 2-ethylhexanol, esters of hydroxycarboxylic acids with linear or branched $C_6$–$C_{22}$-fatty alcohols, in particular dioctyl malate, esters of linear and/or branched fatty acids with polyhydric alcohols (such as e.g. propylene glycol, dimerdiol or trimertriol) and/or Guerbet alcohols, triglycerides based on $C_6$–$C_{10}$-fatty acids, liquid mono-/di-/triglyceride mixtures based on $C_6$–$C_{18}$-fatty acids, esters of $C_6$–$C_{22}$-fatty alcohols and/or Guerbet alcohols with aromatic carboxylic acids, in particular benzoic acid, vegetable oils, branched primary alcohols, substituted cyclohexanes, linear and branched $C_6$–$C_{22}$-fatty alcohol carbonates, Guerbet carbonates, esters of benzoic acid with linear and/or branched $C_6$–$C_{22}$-alcohols (e.g. Finsolv® TN), linear or branched, symmetrical or unsymmetrical dialkyl ethers having 6 to 22 carbon atoms per alkyl group, ring-opening products of epoxidized fatty acid esters with polyols, silicone oils and/or aliphatic or naphthenic hydrocarbons.

Suitable oily substances are animal and vegetable oils, such as, for example, sunflower oil, coconut oil, avocado oil, olive oil or lanolin.

Suitable emulsifiers are, for example, nonionogenic surfactants from at least one of the following groups:

(1) addition products of 2 to 30 mol of ethylene oxide and/or 0 to 5 mol of propylene oxide with linear fatty alcohols having 8 to 22 carbon atoms, with fatty acids having 12 to 22 carbon atoms and with alkylphenols having 8 to 15 carbon atoms in the alkyl group;

(2) $C_{12/18}$-fatty acid mono- and diesters of addition products of from 1 to 30 mol of ethylene oxide with glycerol;

(3) glycerol mono- and diesters and sorbitan mono- and diesters of saturated and unsaturated fatty acids having 6 to 22 carbon atoms and the ethylene oxide addition products thereof;

(4) alkyl mono- and oligoglycosides having 8 to 22 carbon atoms in the alkyl radical and the ethoxylated analogs thereof;

(5) addition products of from 15 to 60 mol of ethylene oxide with castor oil and/or hydrogenated castor oil;

(6) polyol and, in particular, polyglycerol esters, such as e.g. polyglycerol polyricinoleate, polyglycerol poly-12-hydroxystearate or polyglycerol dimerate. Also suitable are mixtures of compounds of two or more of these classes of substance;

(7) addition products of from 2 to 15 mol of ethylene oxide with castor oil and/or hydrogenated castor oil;

(8) partial esters based on linear, branched, unsaturated or saturated $C_{6/22}$-fatty acids, ricinoleic acid, and 12-hydroxystearic acid and glycerol, polyglycerol, pentaerythritol, dipentaerythritol, sugar alcohols (e.g. sorbitol), alkylglucosides (e.g. methylglucoside, butylglucoside, laurylglucoside), and polyglucosides (e.g. cellulose);

5 (9) mono-, di- and trialkyl phosphates, and mono-, di- and/or tri- PEG alkyl phosphates and salts thereof;

(10) wool wax alcohols;

(11) polysiloxane-polyalkyl-polyether copolymers or corresponding derivatives;

(12) mixed esters of pentaerythritol, fatty acids, citric acid and fatty alcohol according to German patent 1165574 and/or mixed esters of fatty acids having 6 to 22 carbon atoms, methylglycose and polyols, preferably glycerol or polyglycerol, and

(13) polyalkylene glycols.

The addition products of ethylene oxide and/or propylene oxide with fatty alcohols, fatty acids, alkylphenols, glycerol mono- and diesters, and sorbitan mono- and diesters of fatty acids or with castor oil are known, commercially available products. They are homolog mixtures whose average degree of alkoxylation corresponds to the ratio of the amounts of ethylene oxide and/or propylene oxide and substrate with which the addition reaction is carried out. $C_{12/18}$-fatty acid mono- and diesters of addition products of ethylene oxide with glycerol are known from German patent 2024051 as refatting agents for cosmetic preparations. $C_{8/18}$-alkyl mono- and oligoglycosides, their preparation and their use are known from the prior art. Their preparation takes place, in particular, by reacting glucose or oligosaccharides with primary alcohols having 8 to 18 carbon atoms. With regard to the glycoside ester, monoglycosides in which a cyclic sugar radical is bonded to the fatty alcohol glycosidically, and also oligomeric glycosides having a degree of oligomerization up to preferably about 8 are suitable. The degree of oligomerization here is a statistical average value which is based on a homolog distribution customary for such technical-grade products.

It is also possible for the emulsifiers used to be zwitterionic surfactants. Zwitterionic surfactants is the term used to refer to those surface-active compounds which carry at least one quaternary ammonium group and at least one carboxylate and one sulfonate group in the molecule. Particularly suitable zwitterionic surfactants are the so-called betaines, such as the N-alkyl-N,N-dimethylammonium glycinates, for example cocoalkyldimethylammonium glycinate, N-acylaminopropyl-N,N-dimethylammonium glycinates, for example cocoacylaminopropyldimethylammonium glycinate, and 2-alkyl-3-carboxymethyl-3-hydroxyethylimidazolines having in each case 8 to 18 carbon atoms in the alkyl or acyl group, and cocoacylaminoethyl hydroxyethylcarboxymethylglycinate. Particular preference is given to the fatty acid amide derivative known under the CTFA name Cocamidopropyl Betaine. Likewise suitable emulsifiers are ampholytic surfactants. Ampholytic surfactants are understood as meaning those surface-active compounds which, apart from a $C_{8/18}$-alkyl or acyl group in the molecule, contain at least one free amino group and at least one —COOH— or —SO$_3$H— group and are capable of forming internal salts. Examples of suitable ampholytic surfactants are N-alkylglycines, N-alkylpropionic acids, N-alkylaminobutyric acids, N-alkyliminodipropionic acids, N-hydroxyethyl-N-alkylamidopropylglycines, N-alkyltaurines, N-alkylsarcosines, 2-alkylaminopropionic acids and alkylaminoacetic acids having in each case about 8 to 18 carbon atoms in the alkyl group. Particularly preferred ampholytic surfactants are N-cocoalkylaminopropionate, cocoacylaminoethylaminopropionate and $C_{12/18}$-acylsarcosine. In addition to the ampholytic emulsifiers, quaternary emulsifiers are also suitable, those of the esterquat type, preferably methylquaternized difatty acid triethanolamine ester salts, being particularly preferred.

As superfatting agents, it is possible to use substances such as, for example, lanolin and lecithin, and polyethoxylated or acylated lanolin and lecithin derivatives, polyol fatty acid esters, monoglycerides and fatty acid alkanolamides, the latter also serving as foam stabilizers.

Examples of suitable pearlescent waxes are: alkylene glycol esters, specifically ethylene glycol distearate; fatty acid alkanolamides, specifically coconut fatty acid diethanolamide; partial glycerides, specifically stearic acid monoglyceride; esters of polybasic, optionally hydroxy-substituted carboxylic acids with fatty alcohols having 6 to 22 carbon atoms, specifically long-chain esters of tartaric acid; fatty substances, such as, for example, fatty alcohols, fatty ketones, fatty aldehydes, fatty ethers and fatty carbonates which have a total of at least 24 carbon atoms, specifically laurone and distearyl ether; fatty acids, such as stearic acid, hydroxystearic acid or behenic acid, ring-opening products of olefin epoxides having 12 to 22 carbon atoms with fatty alcohols having 12 to 22 carbon atoms and/or polyols having 2 to 15 carbon atoms and 2 to 10 hydroxyl groups, and mixtures thereof.

Suitable bodying agents are primarily fatty alcohols or hydroxy fatty alcohols having 12 to 22 and, preferably, 16 to 18 carbon atoms, and also partial glycerides, fatty acids or hydroxy fatty acids. Preference is given to a combination of these substances with alkyl oligoglucosides and/or fatty acid N-methylglucamides of identical chain length and/or polyglycerol poly-12-hydroxystearates. Suitable thickeners are, for example, polysaccharides, in particular xanthan gum, guar guar, agar agar, alginates and tyloses, cellulose derivatives, e.g. carboxymethylcellulose and hydroxyethylcellulose, and also relatively high molecular weight polyethylene glycol mono- and diesters of fatty acids, polyacrylates (e.g. Carbopols® from Goodrich or Synthalens® from Sigma), polyacrylamides, polyvinyl alcohol and polyvinylpyrrolidone, surfactants, such as, for example, ethoxylated fatty acid glycerides, esters of fatty acids with polyols, such as, for example, pentaerythritol or trimethylolpropane, fatty alcohol ethoxylates having a narrowed homolog distribution or alkyl oligoglucosides, and electrolytes, such as sodium chloride and ammonium chloride.

Typical examples of fats are glycerides, and suitable waxes are, inter alia, beeswax, carnauba wax, candelilla wax, montan wax, paraffin wax or microcrystalline waxes, optionally in combination with hydrophilic waxes, e.g. cetylstearyl alcohol or partial glycerides. Stabilizers which may be used are metal salts of fatty acids, such as e.g. magnesium, aluminum and/or zinc stearate or ricinoleate.

Suitable silicone compounds are, for example, dimethylpolysiloxanes, methylphenylpolysiloxanes, cyclic silicones, and amino-, fatty-acid-, alcohol-, polyether-, epoxy-, fluorine-, glycoside- and/or alkyl-modified silicone compounds, which can either be in liquid or resin form at room temperature.

Typical examples of fats are glycerides, and suitable waxes are, inter alia, beeswax, carnauba wax, candelilla wax, montan wax, paraffin wax or microcrystalline waxes, optionally in combination with hydrophilic waxes, e.g. cetylstearyl alcohol or partial glycerides. Stabilizers which can be used are metal salts of fatty acids, such as, for example, magnesium stearate, aluminum stearate and/or zinc stearate.

Suitable solvents are, in particular, water and lower monoalcohols or polyols having 1 to 6 carbon atoms and mixtures thereof; preferred monoalcohols or polyols are ethanol, isopropanol, propylene glycol, glycerol and sorbitol.

To improve the flow behavior, it is also possible to use hydrotropic agents, such as, for example, ethanol, isopropyl alcohol or polyols. Polyols which are suitable here preferably have 2 to 15 carbon atoms and at least two hydroxyl groups. Typical examples are glycerol;

alkylene glycols, such as, for example, ethylene glycol, diethylene glycol, propylene glycol, butylene glycol, hexylene glycol, and polyethylene glycols having an average molecular weight of from 100 to 1000 daltons;

technical-grade oligoglycerol mixtures having a degree of self-condensation of from 1.5 to 10, such as, for example, technical-grade diglycerol mixtures with a diglycerol content of from 40 to 50% by weight;

methylol compounds, such as, in particular, trimethylolethane, trimethylolpropane, trimethylolbutane, pentaerythritol and dipentaerythritol;

lower alkylglucosides, in particular those having 1 to 8 carbon atoms in the alkyl radical, such as, for example, methyl- and butylglucoside;

sugar alcohols having 5 to 12 carbon atoms, such as, for example, sorbitol or mannitol;

sugars having 5 to 12 carbon atoms, such as, for example, glucose or sucrose;

amino sugars, such as, for example, glucamine.

Examples of suitable preservatives are phenoxyethanol, formaldehyde solution, parabens, pentanediol or sorbic acid, and the other classes of substance listed in Appendix 6, Part A and B, of the Cosmetics Directive.

These include, for example, all suitable preservatives with specific action against Gram-positive bacteria, e.g. triclosan (2,4,4'-trichloro-2'-hydroxydiphenyl ether), chlorhexidine (1,1'-hexamethylenebis[5-(4-chlorophenyl)biguanide) and TTC (3,4,4'-trichlorocarbanilide). Quaternary ammonium compounds are in principle likewise suitable, but are used preferentially for disinfecting soaps and washing lotions. Numerous fragrances also have antimicrobial properties. Specific combinations having particular effectiveness against Gram-positive bacteria are used for the composition of deodorant perfumes. Also, a large number of essential oils or characteristic ingredients thereof, such as for example, oil of cloves (eugenol), mint oil (menthol) or thyme oil (thymol), exhibit marked antimicrobial effectiveness.

The preservatives are usually used in concentrations of from about 0.1 to 0.3% by weight.

Perfume oils which may be mentioned are mixtures of natural and synthetic fragrances. Natural fragrances are extracts from flowers (lily, lavender, rose, jasmine, neroli, ylang-ylang), stems and leaves (geranium, patchouli, petitgrain), fruits (aniseed, coriander, cumin, juniper), fruit peels (bergamot, lemon, orange), roots (mace, angelica, celery, cardamom, costus, iris, calmus), woods (pinewood, sandalwood, guaiac wood, cedarwood, rosewood), herbs and grasses (tarragon, lemongrass, sage, thyme), needles and branches (spruce, fir, pine, dwarf-pine), resins and balsams (galbanum, elemi, benzoin, myrrh, olibanum, opoponax). Also suitable are animal raw materials, such as, for example, civet and castoreum. Typical synthetic fragrance compounds are products of the ester, ether, aldehyde, ketone, alcohol and hydrocarbon type. Fragrance compounds of the ester type are e.g. benzyl acetate, phenoxyethyl isobutyrate, p-tert-butylcyclohexyl acetate, linalyl acetate, dimethylbenzylcarbinyl acetate, phenylethyl acetate, linalyl benzoate, benzyl formate, ethyl methylphenylglycinate, allyl cyclohexylpropionate, styrallyl propionate and benzyl salicylate. The ethers include, for example, benzyl ethyl ether, the aldehydes include, for example, the linear alkanals having 8 to 18 carbon atoms, citral, citronellal, citronellyloxyacetaldehyde, cyclamenaldehyde, hydroxycitronellal, lilial and bourgeonal, and the ketones include, for example, the ionones, α-isomethylionone and methyl cedryl ketone, and the alcohols include anethole, citronellol, eugenol, isoeugenol, geraniol, linalool, phenylethyl alcohol and terpineol, and the hydrocarbons include mainly the terpenes and balsams. Preference is, however, given to using mixtures of different fragrances which together produce a pleasing scent note. Essential oils of lower volatility, which are mostly used as flavor components, are also suitable as perfume oils, e.g. sage oil, camomile oil, oil of cloves, balm oil, mint oil, cinnamon leaf oil, lime blossom oil, juniperberry oil, vetiver oil, olibanum oil, galbanum oil, labolanum oil and lavandin oil. Preference is given to using bergamot oil, dihydromyrcenol, lilial, lyral, citronellol, phenylethyl alcohol, α-hexylcinnamaldehyde, geraniol, benzylacetone, cyclamenaldehyde, linalool, boisambrene forte, ambroxan, indole, hedione, sandelice, lemon oil, mandarin oil, orange oil, allyl amyl glycolate, cyclovertal, lavandin oil, clary sage oil, β-damascone, geranium oil bourbon, cyclohexyl salicylate, Vertofix Coeur, Iso-E-Super, Fixolide NP, evernyl, iraldein gamma, phenylacetic acid, geranyl acetate, benzyl acetate, rose oxide, Romillat, Irotyl and Floramat alone or in mixtures.

Dyes which may be used are the substances approved and suitable for cosmetic purposes, as are listed, for example, in the publication "Kosmetische Färbemittel" [Cosmetic Colorants] from the Farbstoffkommission der Deutschen Forschungsgemeinschaft [Dyes Commission of the German Research Council], Verlag Chemie, Weinheim, 1984, pp. 81–106. These dyes are usually used in concentrations of from 0.001 to 0.1% by weight, based on the total mixture.

To set specific properties of hair cosmetic preparations, it may be advantageous to use the polymers according to the invention in the form of a mixture with further hair-setting polymers.

Other polymers which are suitable for this purpose are, for example, anionic, cationic, amphoteric and neutral polymers.

Examples of anionic polymers are homo- and copolymers of acrylic acid and methacrylic acid or salts thereof, homo- and copolymers of acrylic acid and acrylamide and salts thereof, sodium salts of polyhydroxycarboxylic acids, water-soluble or water-dispersible polyesters, polyurethanes (e.g. Luviset™ PUR) and polyureas. Particularly suitable polymers are copolymers of tert-butyl acrylate, ethyl acrylate, methacrylic acid (e.g. Luvimer™ 100 P), copolymers of ethyl acrylate and methacrylic acid, (e.g. Luviflex™ Soft), copolymers of N-tert-butylacrylamide, ethyl acrylate, acrylic acid (Ultrahold Strong™), copolymers of vinyl acetate, crotonic acid and optionally further vinyl esters (e.g. Luviset CA66™), maleic anhydride copolymers, optionally reacted with alcohols, anionic polysiloxanes, e.g. carboxy-functional copolymers of vinylpyrrolidone, tert-butyl acrylate, methacrylic acid (e.g. Luviskol™ VBM), terpolymers of tert-butyl acrylate, methacrylic acid and dimethicone copolyol (e.g. Luviflex® Silk). Copolymers of acrylic acid and methacrylic acid with hydrophobic monomers, e.g. $C_4$–$C_{30}$-alkyl esters of (meth)acrylic acid, $C_4$–$C_{30}$-alkylvinyl esters, $C_4$–$C_{30}$-alkyl vinyl ethers and hyaluronic acid, and other polymers known under the trade names Amerhold DR-25, Ultrahold, Luviset™ P.U.R., Acronal™, Acudyne™, Lovocryl™, Versatyl™, Amphomer™ (28-4910, LV-71), Placise™ L53, Gantrez™ ES 425, Advantage Plus™, Omnirez™ 2000, Resyn™ 28-1310, Resyn™ 28-2930, Balance™ (0/55), Acudyne™ 255, Aristoflex™A or Eastman AQ™.

Other polymers are the polymers obtainable under the INCI name Polysilicone-7 and Polysilicone-8 (Plus™ SA70, Plus™ VS70).

Other polymers are cationic polymers with the INCI name Polyquaternium, e.g. copolymers of vinylpyrrolidone/N-vinylimidazolium salts (Luviquat™ FC, Luviquat™ HM, Luviquat™ MS, Luviquat™ Care), copolymers of N-vinylpyrrolidone/dimethylaminoethyl methacrylate, quaternized with diethyl sulfate (Luviquat™ PQ 11), copolymers of N-vinylcaprolactam/N-vinylpyrrolidone/N-vinylimidazolium salts (Luviquat™ Hold), cationic cellulose derivatives (Polyquaternium-4 and -10), acrylamide copolymers (Polyquaternium-), Styleeze™ CC-10, Aquaflex™ SF-40 and chitosan derivatives.

Other suitable polymers are also neutral polymers, such as polyvinylpyrrolidones, copolymers of N-vinylpyrrolidone and vinyl acetate and/or vinyl propionate, polysiloxanes, polyvinylcaprolactam and copolymers with N-vinylpyrrolidone, polyethyleneimines and salts thereof, polyvinylamines and salts thereof, cellulose derivatives, polyaspartic acid salts and derivatives. These include the polymers known under the following trade names: Luviskol™ (K, VA, Plus), PVP K, PVP/VA, Advantage™ HC and H₂OLD EP-1.

In addition, biopolymers are also suitable, i.e. polymers which are obtained from naturally renewable raw materials and are constructed from natural monomer building blocks, e.g. cellulose derivatives, chitin, chitosan, DNA, hyaluronic acid and RNA derivatives.

Further polymers are also betainic polymers, such as Yukaformers (R205, SM) and Diaformers.

The list below contains the INCI/CTFA names and the manufacturers of the polymers listed above:

| INCI/CTFA | Polymer | Manufacturer |
|---|---|---|
| Acrylates Copolymer | Amerhold DR-25 | Amerchol |
| PVP/VA Copolymer | Luviskol VA | BASF |
| Polyvinylcaprolactam | Luviskol Plus | BASF |
| Styrene/Acrylates Copolymer | Acronal 290 D, 296 D | BASF |
| VA/Crotonates Copolymer | Luviset CA 66 | BASF |
| Acrylates/Acrylamide Copolymer | Ultrahold 8 | BASF |
| Acrylates/Acrylamide Copolymer | Ultrahold Strong | BASF |
| Acrylates Copolymer | Luviflex Soft | BASF |
| Acrylates Copolymer | Luvimer 100P, 36D, 30E | BASF |
| Polyquaternium 46 | Luviquat Hold | BASF |
| Polyurethane-1 | Luviset P.U.R. | BASF |
| Methacryloyl Ethylbetaine/Acrylates Copolymer | Diaformer | Clariant |
| Diglycol/CHDM/Isophthalates/SIP Copolymer | Eastman AQ Polymer | Eastman |
| VA/Crotonates Copolymer | Aristoflex A | Hoechst Celanese |
| Acrylates/Diacetoneacrylamide Copolymer | Plascize L-53 | Goo Chemical |
| PVP | PVP K; Luviskol K | ISP; BASF |
| PVP/VA Copolymer | PVP/VA | ISP |
| Vinyl Caprolactam/PVP/Dimethylaminoethyl Methacrylate Copolymer | Copolymer VC 713 (= Advantage HC) | ISP |
| Vinyl Caprolactam/PVP/Dimethylaminoethyl Methacrylate Copolymer | H₂OLD ® EP-1 | ISP |
| PVM/MA Butyl ester Copolymer | Gantrez ES 425 | ISP |
| VA/Butyl Maleate/Isobornyl Acrylate | Advantage Plus | ISP |
| Ethyl Ester of PVM/MA Copolymer | Omnirez 2000 | ISP |
| PVP/DMAPA Acrylates Copolymer | Styleeze CC-10 | ISP |
| PVP/Vinylcaprolactam/DMAPA Acrylates Copolymer | Aquaflex SF-40 | ISP |
| Methacryloyl Ethyl Betaine/Acrylates Copolymer | Yukaformer R205 Yukaformer SM | Mitsubishi Mitsubishi |
| VA/Crotonates/Copolymer | Resyn 28-1310 | National Starch |
| VA/Crotonates/Neodecanoate Copolymer | Resyn 28-2930 | National Starch |
| VA/Crotonates/Vinyl/Neodecanoate Copolymer | Luviset CAN | BASF |
| Octylacrylamide/Acrylates/Butylaminoethyl Methacrylate Copolymer | Amphomer 28-4910 | National Starch |
| Octylacrylamide/Acrylates/Butylaminoethyl Methacrylate Copolymer | Amphomer LV-71 | National Starch |
| Acrylates/Octylacrylamide Copolymer | Versatyl 42 | National Starch |
| Octylacrylamide/Acrylates Copolymer | Versatyl 90 | National Starch |
| Polysilicone-7 | Plus ™ SA70 | 3M |
| Polysilicone-8 | Plus ™ VS70 | 3M |
| Acrylates Copolymer | Balance 0/55 | National Starch |
| Octylacrylamide/Acrylates/Butyl-aminoethyl Methacrylate Copolymer | Lovocryl 47 | National Starch |
| Acrylates/Hydroxy esters Acrylates | Acudyne | Rohm & Haas |

The total content of auxiliaries and additives may be 1 to 50% by weight, preferably 5 to 40% by weight, based on the compositions.

The auxiliaries may be present during the polymerization and/or be added after the polymerization.

The polymers are suitable in particular for using cosmetic compositions. For example, they can be used in cosmetic compositions for cleansing the skin. Such cosmetic cleansers are chosen from bar soaps, such as toilet soaps, curd soaps, transparent soaps, luxury soaps, deodorizing soaps, cream soaps, baby soaps, skin protection soaps, abrasive soaps and syndets, liquid soaps, such as pasty soaps, soft soaps and washing pastes, and liquid washing, shower and bath preparations, such as washing lotions, shower preparations and gels, foam baths, bath oils and scrub preparations, shaving foams, lotions and creams.

The preparations according to the invention can also be used in cosmetic preparations for skin care. The skin care compositions are, in particular, in the form of W/O or O/W skin creams, day and night creams, eye creams, face creams, antiwrinkle creams, moisturizing creams, bleaching creams, vitamin creams, skin lotions, care lotions and moisturizing lotions.

They are also suitable for skin cosmetic preparations such as face tonics, face masks, deodorants and other cosmetic lotions.

In addition, the polymers according to the invention can be used as strips for pore cleansing or skin firming, in antiacne compositions, repellents, shaving preparations, hair removal compositions, personal hygiene compositions, foot care compositions and in baby care.

Very particular preference is given to the use of the polymers in preparations in decorative cosmetics, in particular the polymers present in powder form.

A particularly suitable polymer for cosmetic preparations is one which is obtainable by free-radical polymerization of a monomer mixture in accordance with claim 1 from (a1) 49.5 to 99% by weight of (meth)acrylate, in particular tert-butyl acrylate, (a2) 0.5 to 40% by weight of another (meth)acrylate, in particular methacrylic acid, (b) 0.5 to 20% by weight of a polyalkylene oxide-containing silicone derivative of the following formula

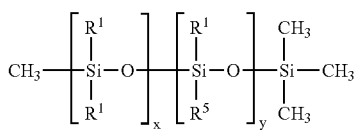

where $R^1 = -CH_3$

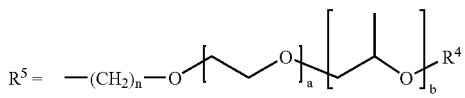

$R^4 = -H$; $-COCH_3$, alkyl with $C_1-C_4$ n=1 to 6, in particular 2 to 4, preferably 3 x and y are integers such that the molecular weight of the polysiloxane block is between 1000 and 10,000, a, b may be integers between 0 and 50, with the proviso that the sum of a and b is greater than 0.

Examples of decorative cosmetic preparations which may be mentioned are concealing sticks, stage makeup, mascara and eyeshadows, lipsticks, kohl pencils, eyeliners, makeup, foundations, blushers and powders and eyebrow pencils, and, in particular, nail varnishes.

The polymers are present in the cosmetic preparations customarily in an amount in the range from about 0.001 to 20% by weight, preferably 0.1 to 10% by weight, based on the total weight of the preparations.

EXAMPLES

Example 1

Preparation of a Polymer (Emulsion Polymerization)

A mixture was prepared from 120 g of water, 6.9 g of Disponil FES77 (=alkyl ether sulfonate Na salt, Henkel) and 126 g of dimethicone copolyol (Belsil DMC6031) and 113 g of feed 1, and heated to 80° C. 24 g of a 7% strength aqueous sodium persulfate solution were then added. Feed 1 was then metered in over the course of 2 hours. Following steam distillation, the mixture was cooled to 60° C., and 108 g of potassium hydrogencarbonate solution were metered in.

Feed 1:

789 g of tert-butyl acrylate 261 g of methacrylic acid 540 g of water 63 g of Disponil FES77

4.53 g of n-dodecylthiol.

Example 2

The preparation according to Example 2 takes place corresponding to Example 1, but using n-decanethiol in place of n-dodecylthiol.

Example 3

A mixture was prepared from 372 g of water, 2.4 g of Disponil FES77 (=alkyl ether sulfonate Na salt, Henkel), 42 g of dimethicone copolyol (Belsil DMC6031=PEG/PPG-25/25 Dimethicone, Wacker) and 35 g of feed 1, and heated to 40° C. 8 g of a 7% strength aqueous sodium persulfate solution were then added. The mixture was then heated to 80° C. and feed 1 was metered in over the course of 2 hours. And then 89 g of water were added and the mixture was afterpolymerized for 2 hours at 80° C. After cooling to 60° C., 47 g of potassium hydrogencarbonate solution (10% strength) were added.

Feed 1:

150 g of water 21.6 g of Disponil FES77

263 g of tert-butyl acrylate 88 g of methacrylic acid 0.96 g of n-dodecylthiol.

Example 4

Example 4 was prepared according to Example 3, but using n-decanethiol in place of n-dodecylthiol.

Comparative Example

The comparative example was prepared according to Example 3, but using ethylhexyl thioglycolate in place of n-dodecylthiol.

The dispersions prepared according to Examples 1 to 4 and comparative example were converted into powder form by means of spray-drying.

The odor assessment of the polymers prepared according to Examples 1 to 4 and comparative example, and of the powders prepared therefrom was carried out by a panel of 5 test persons. For this purpose, the polymers prepared according to the examples were dried, dissolved in 30% strength ethanolic solution and then formulated as a 3% strength aqueous solution and 100% neutralized with 2-amino-2-methylpropanol. For the odor assessment of the powders, these were dissolved in 30% strength ethanolic solution and then formulated as 3% strength aqueous solution and neutralized.

The evaluation of the odor properties is carried out in accordance with the following classification:

"1" no odor

"2" weak, unpleasant odor

"3" strong, unpleasant odor.

Powders and dispersions were evaluated in terms of odor as follows:

Grade 1: C2, C4 (in each case dispersion and powder)

Grade 2: C1, C3 (in each case dispersion and powder)

Grade 3: Comparative example (dispersion and powder).

| Polymers | 80:20 mixing ratio | 50:50 mixing ratio | 20:80 mixing ratio |
|---|---|---|---|
| Powder as in C1–C4/Luviskol VA37 | 3.2% powder as in C1–C4<br>1.6% Luviskol VA37E<br>0.74% AMP<br>54.46% Ethanol<br>40.0% DME | 2.0% powder as in C1–C4<br>4.0% Luviskol VA37E<br>0.46% AMP<br>53.54% Ethanol<br>40.0% DME | 0.8% powder as in C1–C4<br>3.2% Luviskol VA37E<br>0.19% AMP<br>52.61% Ethanol<br>40.0% DME |
| Powder as in C1–C4/Luviskol K30 | 3.2% powder as in C1–C4<br>0.8% Luviskol K30<br>0.74% AMP<br>55.26% Ethanol<br>40.0% DME | 2.0% powder as in C1–C4<br>2.0% Luviskol K30<br>0.46% AMP<br>55.54% Ethanol<br>40.0% DME | 0.8% powder as in C1–C4<br>3.2% Luviskol K30<br>0.19% AMP<br>55.81% Ethanol<br>40.0% DME |
| Powder as in C1–C4/Luviskol Plus | 3.2% powder as in C1–C4<br>2.0% Luviskol Plus<br>0.74% AMP<br>54.06% Ethanol<br>40.0% DME | 2.0% powder as in C1–C4<br>5.0% Luviskol Plus<br>0.46% AMP<br>52.54% Ethanol<br>40.0% DME | 0.8% powder as in C1–C4<br>8.0% Luviskol Plus<br>0.19% AMP<br>51.01% Ethanol<br>40.0% DME |
| Powder as in C1–C4/Luviset P.U.R. | 3.2% powder as in C1–C4<br>2.67% Luviset P.U.R<br>0.73% AMP<br>53.40% Ethanol<br>40.0% DME | 2.0% powder as in C1–C4<br>6.67% Luviset P.U.R<br>0.46% AMP<br>50.87% Ethanol<br>40.0% DME | 0.8% powder as in C1–C4<br>10.67% Luviset P.U.R<br>0.19% AMP<br>48.34% Ethanol<br>40.0% DME |
| Powder as in C1–C4/Luvimer 100P | 3.2% powder as in C1–C4<br>0.8% Luvimer 100P<br>0.93% AMP<br>55.07% Ethanol<br>40.0% DME | 2.0% powder as in C1–C4<br>2.0% Luvimer 100P<br>0.94% AMP<br>55.06% Ethanol<br>40.0% DME | 0.8% powder as in C1–C4<br>3.2% Luvimer 100P<br>0.95% AMP<br>55.05% Ethanol<br>40.0% DME |
| Powder as in C1–C4/Ultrahold 8 | 3.2% powder as in C1–C4<br>0.8% Ultrahold 8<br>0.82% AMP<br>55.18% Ethanol<br>40.0% DME | 2.0% powder as in C1–C4<br>2.0% Ultrahold 8<br>0.66% AMP<br>55.34% Ethanol<br>40.0% DME | 0.8% powder as in C1–C4<br>3.2% Ultrahold 8<br>0.51% AMP<br>55.49% Ethanol<br>40.0% DME |
| Powder as in C1–C4/Ultrahold Strong | 3.2% powder as in C1–C4<br>0.8% Ultrahold Strong<br>0.84% AMP<br>55.16% Ethanol<br>40.0% DME | 2.0% powder as in C1–C4<br>2.0% Ultrahold Strong<br>0.71% AMP<br>55.29% Ethanol<br>40.0% DME | 0.8% powder as in C1–C4<br>3.2% Ultrahold Strong<br>0.59% AMP<br>55.41% Ethanol<br>40.0% DME |
| Powder as in C1–C4/Luviset CA66 | 3.2% powder as in C1–C4<br>0.8% Luviset CA66<br>0.82% AMP<br>55.18% Ethanol<br>40.0% DME | 2.0% powder as in C1–C4<br>2.0% Luviset CA66<br>0.69% AMP<br>55.31% Ethanol<br>40.0% DME | 0.8% powder as in C1–C4<br>3.2% Luviset CA66<br>0.53% AMP<br>55.47% Ethanol<br>40.0% DME |
| Powder as in C1–C4/Luviset CAN | 3.2% powder as in C1–C4<br>0.8% Luviset CAN<br>0.82% AMP<br>55.18% Ethanol<br>40.0% DME | 2.0% powder as in C1–C4<br>2.0% Luviset CAN<br>0.70% AMP<br>55.30% Ethanol<br>40.0% DME | 0.8% powder as in C1–C4<br>3.2% Luviset CAN<br>0.54% AMP<br>55.46% Ethanol<br>40.0% DME |
| Powder as in C1–C4/Amphomer | 3.2% powder as in C1–C4<br>0.8% Amphomer<br>0.88% AMP<br>55.12% Ethanol<br>40.0% DME | 2.0% powder as in C1–C4<br>2.0% Amphomer<br>0.83% AMP<br>54.87% Ethanol<br>40.0% DME | 0.8% powder as in C1–C4<br>3.2% Amphomer<br>0.77% AMP<br>55.23% Ethanol<br>40.0% DME |

Hairsprays containing Pr/Bu 3.5 or Pr/Bu 3.5 and DME

| Polymers | 80:20 mixing ratio | 50:50 mixing ratio | 20:80 mixing ratio |
|---|---|---|---|
| Powder as in C1–C4/Luviskol VA37 | 3.2% powder as in C1–C4<br>1.6% Luviskol VA37E<br>0.74% AMP<br>54.46% Ethanol<br>10.0% Pr/Bu 3.5<br>30.0% DME | 2.0% powder as in C1–C4<br>4.0% Luviskol VA37E<br>0.46% AMP<br>52.54% Ethanol<br>10.0% Pr/Bu 3.5<br>30.0% DME | 0.8% powder as in C1–C4<br>3.2% Luviskol VA37E<br>0.19% AMP<br>52.61% Ethanol<br>10.0% Pr/Bu 3.5<br>30.0% DME |
| Powder as in C1–C4/Luviskol K30 | 3.2% powder as in C1–C4<br>0.8% Luviskol K30<br>0.74% AMP<br>55.26% Ethanol<br>40.0% Pr/Bu 3.5 | 2.0% powder as in C1–C4<br>2.0% Luviskol K30<br>0.46% AMP<br>55.54% Ethanol<br>40.0% Pr/Bu 3.5 | 0.8% powder as in C1–C4<br>3.2% Luviskol K30<br>0.19% AMP<br>55.81% Ethanol<br>40.0% Pr/Bu 3.5 |

-continued

| Polymers | 80:20 mixing ratio | 50:50 mixing ratio | 20:80 mixing ratio |
|---|---|---|---|
| Powder as in C1–C4/Luviskol Plus | 3.2% powder as in C1–C4<br>2.0% Luviskol Plus<br>0.74% AMP<br>54.06% Ethanol<br>40.0% Pr/Bu 3.5 | 2.0% powder as in C1–C4<br>5.0% Luviskol Plus<br>0.46% AMP<br>52.54% Ethanol<br>40.0% Pr/Bu 3.5 | 0.8% powder as in C1–C4<br>8.0% Luviskol Plus<br>0.19% AMP<br>51.01% Ethanol<br>40.0% Pr/Bu 3.5 |
| Powder as in C1–C4/Luviset P.U.R. | — | 2.0% powder as in C1–C4<br>6.67% Luviset P.U.R<br>0.46% AMP<br>50.87% Ethanol<br>10% Pr/Bu 3.5<br>30.0% DME | 0.8% powder as in C1–C4<br>10.67% Luviset P.U.R<br>0.19% AMP<br>48.34% Ethanol<br>15% Pr/Bu 3.5<br>25.0% DME |
| Powder as in C1–C4/Luvimer 100P | 3.2% powder as in C1–C4<br>0.8% Luvimer 100P<br>0.93% AMP<br>55.07% Ethanol<br>40.0% Pr/Bu 3.5 | 2.0% powder as in C1–C4<br>2.0% Luvimer 100P<br>0.94% AMP<br>55.06% Ethanol<br>40.0% Pr/Bu 3.5 | 0.8% powder as in C1–C4<br>3.2% Luvimer 100P<br>0.95% AMP<br>55.05% Ethanol<br>40.0% Pr/Bu 3.5 |
| Powder as in C1–C4/Ultrahold 8 | 3.2% powder as in C1–C4<br>0.8% Ultrahold 8<br>0.82% AMP<br>55.18% Ethanol<br>40.0% Pr/Bu 3.5 | 2.0% powder as in C1–C4<br>2.0% Ultrahold 8<br>0.66% AMP<br>55.34% Ethanol<br>40.0% Pr/Bu 3.5 | 0.8% powder as in C1–C4<br>3.2% Ultrahold 8<br>0.51% AMP<br>55.49% Ethanol<br>40.0% Pr/Bu 3.5 |
| Powder as in C1–C4/Ultrahold Strong | 3.2% powder as in C1–C4<br>0.8% Ultrahold Strong<br>0.84% AMP<br>55.16% Ethanol<br>40.0% Pr/Bu 3.5 | 2.0% powder as in C1–C4<br>2.0% Ultrahold Strong<br>0.71% AMP<br>55.29% Ethanol<br>40.0% Pr/Bu 3.5 | 0.8% powder as in C1–C4<br>3.2% Ultrahold Strong<br>0.59% AMP<br>55.41% Ethanol<br>40.0% Pr/Bu 3.5 |
| Powder as in C1–C4/Luviset CA66 | 3.2% powder as in C1–C4<br>0.8% Luviset CA66<br>0.82% AMP<br>55.18% Ethanol<br>10.0% Pr/Bu 3.5<br>30.0% DME | 2.0% powder as in C1–C4<br>2.0% Luviset CA66<br>0.69% AMP<br>55.31% Ethanol<br>10.0% Pr/Bu 3.5<br>30.0% DME | 0.8% powder as in C1–C4<br>3.2% Luviset CA66<br>0.53% AMP<br>55.47% Ethanol<br>10.0% Pr/Bu 3.5<br>30.0% DME |
| Powder as in C1–C4/Luviset CAN | 3.2% powder as in C1–C4<br>0.8% Luviset CAN<br>0.82% AMP<br>55.18% Ethanol<br>20.0% Pr/Bu 3.5<br>20.0% DME | 2.0% powder as in C1–C4<br>2.0% Luviset CAN<br>0.70% AMP<br>55.3% Ethanol<br>20.0% Pr/Bu 3.5<br>20.0% DME | 0.8% powder as in C1–C4<br>3.2% Luviset CAN<br>0.54% AMP<br>55.46% Ethanol<br>20.0% Pr/Bu 3.5<br>20.0% DME |
| Powder as in C1–C4/Amphomer | 3.2% powder as in C1–C4<br>0.8% Amphomer<br>0.88% AMP<br>55.12% Ethanol<br>40.0% Pr/Bu 3.5 | 2.0% powder as in C1–C4<br>2.0% Amphomer<br>0.83% AMP<br>54.87% Ethanol<br>40.0% Pr/Bu 3.5 | 0.8% powder as in C1–C4<br>3.2% Amphomer<br>0.77% AMP<br>55.23% Ethanol<br>40.0% Pr/Bu 3.5 |

Pumpsprays

| Polymers | 8:2 mixing ratio | 1:1 mixing ratio | 2:8 mixing ratio |
|---|---|---|---|
| Powder as in C1–C4/Luviskol VA37 | 5.4% powder as in C1–C4<br>2.66% Luviskol VA37E<br>1.27% AMP<br>90.67% Ethanol | 3.37% powder as in C1–C4<br>6.66% Luviskol VA37E<br>0.79% AMP<br>89.18% Ethanol | 1.35% powder as in C1–C4<br>10.64% Luviskol VA37E<br>0.32% AMP<br>87.69% Ethanol |
| Powder as in C1–C4/Luviskol K30 | 5.4% powder as in C1–C4<br>1.33% Luviskol K30<br>1.27% AMP<br>92.0% Ethanol | 3.37% powder as in C1–C4<br>3.33% Luviskol K30<br>0.79% AMP<br>87.51% Ethanol | 2.69% powder as in C1–C4<br>5.32% Luviskol K30<br>0.32% AMP<br>85.03% Ethanol |
| Powder as in C1–C4/Luviskol Plus | 5.4% powder as in C1–C4<br>3.33% Luviskol Plus<br>1.27% AMP<br>90.0% Ethanol | 3.37% powder as in C1–C4<br>8.33% Luviskol Plus<br>0.79% AMP<br>92.51% Ethanol | 1.35% powder as in C1–C4<br>13.3% Luviskol Plus<br>0.32% AMP<br>91.55% Ethanol |

-continued

| Polymers | 8:2 mixing ratio | 1:1 mixing ratio | 2:8 mixing ratio |
|---|---|---|---|
| Powder as in C1–C4/Luviset P.U.R. | 5.4% powder as in C1–C4<br>4.43% Luviset P.U.R<br>1.27% AMP<br>88.85% Ethanol | 3.37% powder as in C1–C4<br>11.1% Luviset P.U.R<br>0.79% AMP<br>84.74% Ethanol | 1.35% powder as in C1–C4<br>17.73% Luviset P.U.R<br>0.32% AMP<br>80.6% Ethanol |
| Powder as in C1–C4/Luvimer 100P | 5.4% powder as in C1–C4<br>1.33% Luvimer 100P<br>1.55% AMP<br>91.72% Ethanol | 3.37% powder as in C1–C4<br>3.33% Luvimer 100P<br>1.56% AMP<br>91.74% Ethanol | 1.35% powder as in C1–C4<br>5.32% Luvimer 100P<br>1.58% AMP<br>91.75% Ethanol |
| Powder as in C1–C4/Ultrahold 8 | 5.4% powder as in C1–C4<br>1.33% Ultrahold 8<br>1.36% AMP<br>91.91% Ethanol | 3.37% powder as in C1–C4<br>3.33% Ultrahold 8<br>1.1% AMP<br>92.2% Ethanol | 1.35% powder as in C1–C4<br>5.32% Ultrahold 8<br>0.85% AMP<br>92.48% Ethanol |
| Powder as in C1–C4/Ultrahold Strong | 5.4% powder as in C1–C4<br>1.33% Ultrahold Strong<br>1.4% AMP<br>91.87% Ethanol | 3.37% powder as in C1–C4<br>3.33% Ultrahold Strong<br>1.18% AMP<br>92.12% Ethanol | 1.35% powder as in C1–C4<br>5.32% Ultrahold Strong<br>0.98% AMP<br>92.35% Ethanol |
| Powder as in C1–C4/Luviset CA66 | 5.4% powder as in C1–C4<br>1.33% Luviset CA66<br>1.36% AMP<br>91.91% Ethanol | 3.37% powder as in C1–C4<br>3.33% Luviset CA66<br>1.15% AMP<br>92.15% Ethanol | 1.35% powder as in C1–C4<br>5.32% Luviset CA66<br>0.88% AMP<br>92.15% Ethanol |
| Powder as in C1–C4/Luviset CAN | 5.4% powder as in C1–C4<br>1.33% Luviset CAN<br>1.37% AMP<br>91.9% Ethanol | 3.37% powder as in C1–C4<br>3.33% Luviset CAN<br>1.17% AMP<br>92.13% Ethanol | 1.35% powder as in C1–C4<br>5.32% Luviset CAN<br>0.9% AMP<br>92.43% Ethanol |
| Powder as in C1–C4/Amphomer | 5.4% powder as in C1–C4<br>1.33% Amphomer<br>1.47% AMP<br>91.8% Ethanol | 3.37% powder as in C1–C4<br>3.33% Amphomer<br>1.38% AMP<br>91.92% Ethanol | 1.35% powder as in C1–C4<br>3.33% Amphomer<br>1.28% AMP<br>94.04% Ethanol |

Hairspray formulations based on isobutane and n-pentane

| | | |
|---|---|---|
| A) | 3.4% | Powder as in C1–C4 |
| | 0.79% | AMP = 2-amino-2-methyl-1-propanol |
| | 14.2% | n-Pentane |
| | 2.4% | n-Butane |
| | 35.9% | isobutane |
| | 43.31% | ethanol abs. |
| B) | 3.0% | Ultrahold Strong |
| | 0.5% | Powder as in C1–C4 |
| | 0.48% | AMP |
| | 0.03% | DC 190 (PEG/PPG-18/18 Dimethicone; DOW Corning) |
| | 14.2% | n-Pentane |
| | 2.4% | n-Butane |
| | 35.9% | Isobutane |
| | 43.49% | Ethanol |

Shine Spray

| | |
|---|---|
| 2.0% | Powder as in C1–C4 |
| 0.46% | AMP |
| 1.0% | DC 556 (Phenyl Trimethicone; DOW Corning) |
| 0.1% | Niacinamide |
| 0.2% | D-Panthenol |
| 14.2% | n-Pentane |
| 35.9% | n-Butane |
| 46.14% | Ethanol |

Hairspray VOC 80 Containing HFC 152A

| | |
|---|---|
| 3.4% | Powder as in C1–C4 |
| 0.79% | AMP |
| 60.0% | Ethanol abs. |
| 15.81% | HFC 152A (Hydrofluorocarbon 152a) |
| 20% | Dimethyl ether |

Hairspray VOC 55 Containing Vitamins

| | |
|---|---|
| 3.4% | Powder as in C1–C4 |
| 0.79% | AMP |
| 0.1% | Niacinamide |
| 0.1% | Panthenol |
| 40.61% | Water |
| 15.0% | Ethanol |
| 40.0% | DME |

Sunscreen Pumpspray for Hair

| | |
|---|---|
| 1% | Powder as in C1–C4 |
| 0.23% | AMP |
| 2% | Uvinul MS 40 (BASF AG) |
| 96.77% | Ethanol |

VOC 80 Formulation

| | |
|---|---|
| 3.96% | Powder as in C1–C4 |
| 0.92% | AMP |
| 0.10% | Diisobutyl adipate |
| 0.05% | Isodecane |
| 0.10% | Perfume oil |
| 0.05% | D-Panthenol USP |
| 14.78% | Water, dist. |
| 40.04% | Ethanol |
| 40.0% | DME (dimethyl ether) |

VOC 55 Formulation

| | |
|---|---|
| 3.96% | Powder as in C1–C4 |
| 0.92% | AMP |
| 36.16% | Water, dist. |
| 18.96% | Ethanol |
| 40.0% | DME |

Hair Repair

| | |
|---|---|
| 3.0% | Powder as in C1–C4 |
| 0.69% | AMP |
| 0.2% | Hydrolyzed wheat protein |
| 0.5% | D-Panthenol |
| 5.0% | Propylene glycol |
| 10.0% | Ethanol abs. |
| 80.61% | Water |

Shining Gel for Hair with UV Protection

| | | |
|---|---|---|
| Phase A | 0.8% | Carbopol 2001 ETD (Carbomer, B. F. Goodrich) |
| | 34.84% | Water |
| Phase B | 5.0% | Abil 200 |
| | 3.0% | Karion F (D-Sorbitol) |
| | 3.0% | 1,2-Propylene glycol |
| | 1.0% | Cremophor RH40 |
| | q.s. | Preservative |
| Phase C | 50.0% | Water |
| | 0.5% | Uvinul P25 |
| | 1.0% | Powder as in C1–C4 |
| | 0.23% | AMP |
| Phase D | 0.63% | AMP |

Hair Gel

| | | |
|---|---|---|
| Phase A | 0.50% | Carbopol 940 |
| | 49.50% | Water, dist |
| | 0.40% | Triethanolamine |
| Phase B | 0.50% | Powder as in C1–C4 |
| | 0.12% | AMP |
| | 20.00% | Ethanol abs. |
| | 28.98% | Water, dist. |

Shampoo Formulation

| | |
|---|---|
| 1.0% | Powder as in C1–C4 |
| 0.23% | AMP |
| 10.0% | Tegobetaine L 7 |
| 40.0% | Texapon NSO |
| 0.1% | Euxyl K 100 |
| 2.0% | NaCl |
| 46.67% | Water |

Shampoo Formulation Containing Luviquat Care

| | |
|---|---|
| 1.0% | Powder as in C1–C4 |
| 0.23% | AMP |
| 7.7% | Luviquat Care |
| 10.0% | Tegobetaine L 7 |
| 40.0% | Texapon NSO |
| 0.1% | Euxyl K 100 |
| 2.0% | NaCl |
| 38.97% | Water |

Hair Cocktail

| | |
|---|---|
| A) | |
| 3.00 | Luvigel EM |
| 2.00 | Wacker Belsil DM 1000 |
| 3.00 | Wacker Belsil CM 1000 |
| 2.00 | Wacker Belsil PDM 200 |
| 2.00 | Wacker Belsil ADM 6057 E |
| 0.50 | Wacker Belsil DMC 6031 |
| 1.00 | Macadamia nut oil |
| 0.50 | Vitamin E acetate |
| 1.00 | Cremophor RH 40 |
| 0.40 | "Disco" perfume oil |
| B) | |
| 2.00 | Powder as in C1–C4 |
| 0.46 | AMP |
| 0.10 | Euxyl K 100 |
| ad 100 | Water, dist. |

Mascara

| | | |
|---|---|---|
| Phase A | 1.5% | Cremophor A6 |
| | 1.5% | Cremophor A25 |
| | 2.0% | Stearic acid |
| | 3.0% | Imwitor 960 K |
| | 3.0% | Softisan 100 |
| | 1.5% | Luvigel EM |
| | 10.0% | Dow Corning 345 |
| Phase B | 2.0% | Powder as in C1–C4 |
| | 0.46% | AMP |
| | 0.3% | Germal 115 |
| | 74.24% | Water |
| Phase C | 0.5% | Phenoxyethanol |

Mascara

| | |
|---|---|
| A) | |
| 25.72 | Water, dist. |
| 3.00 | Lutrol E 400 |
| 0.50 | Keltrol F |
| 0.10 | Abiol |

-continued

| | | |
|---|---|---|
| 0.40 | Euxyl K 400 | |
| 1.30 | Neutrol TE | |
| B) | | |
| 25.60 | Water, dist. (hot) | |
| 0.98 | AMP | |
| 4.40 | Powder as in C1–C4 | |
| C) | | |
| 8.00 | Carnauba Wax | |
| 4.00 | Beeswax | |
| 4.00 | Isohexadecane | |
| 4.00 | Panalene H 300 E | |
| 5.00 | Stearic acid | |
| 1.00 | Glycerol monostearate | |
| 2.00 | Finsolv TN | |
| D) | | |
| 7.00 | Sicomet Green P 77 288 | |
| E) | | |
| 3.00 | Sicopearl Fantastico Gold | |

Lipstick

| Trade name | INCI | % |
|---|---|---|
| Abil Wax 9801 | Cetyl Dimethicone | 0.56 |
| Carnauba Wax 2442 L | Carnauba Wax | 2.89 |
| Candelilla Wax 2039 Y | Candelilla Wax | 8.67 |
| Lunacera W 80 | Ceresin | 3.82 |
| Rewopol PIB 1000 | Polyisobutene | 1.16 |
| Adeps Lanae Lite | Lanolin | 34.68 |
| Crodamol ML | Myristyl Lactate | 15.03 |
| Napvis D 10 | Napvis Polybutene | 2.31 |
| Luvitol EHO | Ceteraryl Octanoate | 25.26 |
| Castor oil | Castor Oil | 4.05 |
| (−)-alpha-Bisabolol nat. | Bisabolol | 0.12 |
| Vitamin E Acetate | Tocopheryl Acetate | 0.87 |
| d,l-alpha-Tocopherol | Tocopherol | 0.58 |
| Basic lipstick mass | | 49.50 g |
| Powder as in C1–C4 | | 0.50 g |

Melt basic lipstick mass and incorporate powder with stirring.

We claim:

1. A process for the preparation of polymers for cosmetic preparations by free-radical polymerization from
   (a) ethylenically unsaturated monomers
   (b) polyalkylene oxide-containing silicone derivatives,
   which comprises carrying out the polymerization in the presence of alkanethiols having a carbon chain length of C10.

2. A process as claimed in claim 1, wherein the polymer is converted to powder form.

3. A process as claimed in claim 2, wherein the polymer is converted to powder form by spray-drying.

4. A process as claimed in claim 1, wherein 0.1 to 5% by weight of alkanethiols, based on the monomers (a), are used.

5. A process as claimed in claim 1, wherein the polyalkylene oxide-containing silicone derivatives (b) used are those of the formula I:

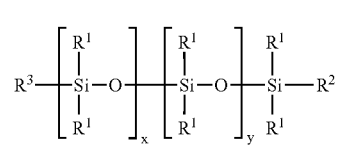

where:
$R^2 = CH_3$ or

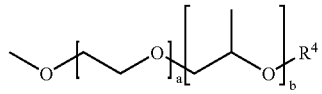

$R^3 = CH_3$ or $R^2$

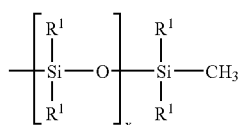

$R^4 = H, CH_3,$

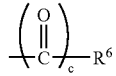

$R^6$ is an organic radical having 1 to 40 carbon atoms which may contain amino, carboxylic acid or sulfonate groups, and, when C=O, is also the anion of an inorganic acid, and where the radicals $R^1$ may be identical or different, and originate either from the group of aliphatic hydrocarbons having 1 to 20 carbon atoms, of cyclic aliphatic hydrocarbons having 3 to 20 carbon atoms, are of an aromatic nature or are identical to $R^5$, where:

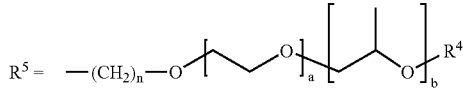

with the proviso that at least one of the radicals $R^1$, $R^2$ or $R^3$ is a polyalkylene oxide-containing radical according to the above definition, and n is an integer from 1 to 6, x and y are integers such that the molecular weight of the polysiloxane block is between 300 and 30,000, a, b may be integers between 0 and 50, with the proviso that the sum of a and b is greater than 0, and c is 0 or 1.

6. A process as claimed in claim 5, wherein formula I has the following meaning

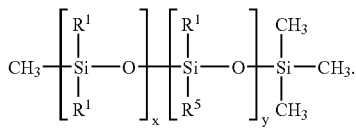

7. A process as claimed in claim 6, wherein formula I has the following meaning

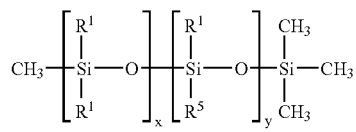

where
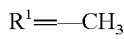
$R^1 = -CH_3$

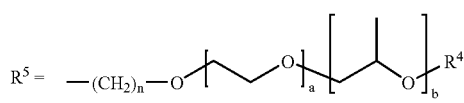

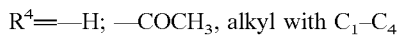

$R^4 = -H; -COCH_3$, alkyl with $C_1-C_4$
n=1 to 6,
x and y are integers such that the molecular weight of the polysiloxane block is between 1000 and 10,000,
a, b may be integers between 0 and 50, with the proviso that the sum of a and b is greater than 0.

8. A process as claimed in claim 1, wherein (a) is at least one (meth)acrylate.

9. A process as claimed in claim 1, wherein
(a) is selected from the group consisting of
(a1) tertbutyl acrylate
(a2) methacrylic acid, and mixtures thereof.

10. A process as claimed in claim 1, wherein
(a) constitutes 50 to 99.9% by weight and
(b) constitutes 0.1 to 50% by weight,
with the proviso that the proportions add up to 100%.

11. A process as claimed in claim 1, wherein
(a1) constitutes 49.5 to 99.0% by weight and
(a2) constitutes 0.5 to 40% by weight
(b) constitutes 0.5 to 20% by weight
with the proviso that the proportions add up to 100%.

12. A polymer which is prepared by a process as claimed in claim 1.

13. A polymer as claimed in claim 12 in powder form.

14. A cosmetic preparation, comprising:
the polymer as claimed in claim 12 and a cosmetically acceptable medium.

15. A hair cosmetic preparation, comprising:
the polymer as claimed in claim 12,
water,
an organic solvent, and optionally
a propellant.

16. A cosmetic preparation, comprising:
the polymer as claimed in claim 13 and a cosmetically acceptable medium.

17. A hair cosmetic preparation, comprising:
the polymer as claimed in claim 13,
water, an organic solvent, and optionally
a propellant.

18. The process of claim 1, wherein said alkanethiol is n-decanethiol.

* * * * *